(12) United States Patent
Bergkvist et al.

(10) Patent No.: US 7,198,425 B2
(45) Date of Patent: Apr. 3, 2007

(54) STEERING SHAFT COUPLING FOR AUTOMOTIVE VEHICLE

(75) Inventors: Lars Bergkvist, Gothenburg (SE); Lars Mogren, Gothenburg (SE); Markus Nyman, Gothenburg (SE); Mathias Petersson, Grabo (SE); Andreas Svensson, Gothenburg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 403 days.

(21) Appl. No.: 10/248,844

(22) Filed: Feb. 24, 2003

(65) Prior Publication Data

US 2003/0159536 A1    Aug. 28, 2003

(30) Foreign Application Priority Data

Feb. 25, 2002  (EP) ................... 02004147

(51) Int. Cl.
*B25G 3/28*    (2006.01)
(52) U.S. Cl. ................ 403/359.5; 403/109.3; 74/492
(58) Field of Classification Search ........... 74/491, 74/492; 403/359.1, 329, 332, 359.4, 359.5, 403/1, 16, 109.3, 309, 311, 314, 328, 341, 403/359.6; 464/182
See application file for complete search history.

(56) References Cited

U.S. PATENT DOCUMENTS

| 3,279,835 | A | * | 10/1966 | Krohm | 403/326 |
|---|---|---|---|---|---|
| 3,531,144 | A | * | 9/1970 | Bizilia | 403/326 |
| 3,588,154 | A | * | 6/1971 | Voight et al. | 403/300 |
| 3,832,076 | A |  | 8/1974 | Gehrke | |
| 3,962,931 | A | * | 6/1976 | Moneta | 74/493 |
| 4,124,318 | A | * | 11/1978 | Sagady | 403/14 |
| 4,261,668 | A | * | 4/1981 | Rigal | 403/319 |
| 4,607,539 | A | * | 8/1986 | Arima et al. | 74/492 |
| 4,938,094 | A | * | 7/1990 | Cochard | 74/552 |
| 5,499,884 | A | * | 3/1996 | Kuhnhold et al. | 403/359.5 |
| 5,667,332 | A | * | 9/1997 | Lindholm | 403/359.5 |
| 6,026,704 | A |  | 2/2000 | Shibata et al. | |
| 6,190,263 | B1 | * | 2/2001 | Kimoto et al. | 464/181 |
| 6,241,616 | B1 | * | 6/2001 | Lightcap | 464/162 |
| 6,279,953 | B1 | * | 8/2001 | Cartwright | 280/779 |
| 6,390,925 | B1 | * | 5/2002 | Perrow | 464/111 |
| 6,428,236 | B2 | * | 8/2002 | Aota et al. | 403/359.5 |
| 6,755,746 | B2 | * | 6/2004 | Barnley et al. | 464/162 |

FOREIGN PATENT DOCUMENTS

| EP | 0 300 854 B1 | 6/1988 |
|---|---|---|
| EP | 0 612 650 B1 | 2/1994 |
| EP | 1 106 847 A2 | 11/2000 |
| EP | 1 106 847 A3 | 11/2000 |
| GB | 2 256 027 A | 5/1991 |
| GB | 2 270 054 A | 8/1992 |

\* cited by examiner

*Primary Examiner*—Richard Ridley
*Assistant Examiner*—James Pilkington
(74) *Attorney, Agent, or Firm*—Raymond L. Coppiellie; Artz & Artz, P.C.

(57) ABSTRACT

A steering shaft coupling for an automotive vehicle includes first and second shaft sections which are both serrated and which may be telescopically engaged. The shaft sections are locked together with an elastically deformable locking ring which is positioned within internal and external grooves formed on the shaft sections. The shaft sections are resiliently biased so as to resist unwanted vibration while in use in a vehicle by means of an elastomeric load and seal ring positioned between the assembled shaft sections.

5 Claims, 7 Drawing Sheets

STEERING SHAFT COUPLING FOR AUTOMOTIVE VEHICLE

BACKGROUND OF INVENTION

This application claims the benefit of Patent Application No. EP 02 00 4147, filed Feb. 25, 2002.

1. Field of the Invention

The present invention relates to a steering shaft coupling for an automotive vehicle in which serrated or splined male and female portions of the shaft coupling are locked together axially and resiliently biased by separate elements contained within the shaft coupling itself.

2. Disclosure Information

Automotive designers are continually faced with necessity of providing components which are easily assembled but which provide superior function as compared with earlier designs. Steering systems are no exception to this requirement. In the case of steering column shafts, an ideal shaft coupling provides for easy assembly within a crowded engine compartment, while functioning throughout the useful life of the vehicle without producing unwanted noise, vibration or harshness. EP 0 300 854 A (Renault) discloses an axially engageable steering coupling having a snap ring retainer but no axially biasing structure. The coupling of the '854 patent will thus be prone to unwanted vibration borne of unwanted axial movement. GB 2 270 054 A (General Motors) discloses a snap fit steering column connection having an external spring for axially biasing the joint. Because the biasing spring is mounted externally of the joint, the device of the '054 patent will require an additional retention ring and spring, both of which are subject to corrosion and loss of structural integrity because of their exterior mounting, and both of which present cost over and above that attendant the present inventive coupling.

The present steering system coupling solves the problems associated with prior art devices by providing a coupling which is both axially engageable without the need for special tools, but which also provides resilient axial biasing with a system which is not subject to corrosion damage.

SUMMARY OF INVENTION

A steering shaft coupling for an automotive vehicle includes a first shaft section having a cylindrical outer surface with a plurality of serrations formed thereon. The terms "serration" and "splines" are used interchangeably herein to mean longitudinally extending teeth which are formed on mating male and female parts to permit torque transmitting telescopic engagement. An elastically deformable locking ring is mounted in an annular groove formed in the leading portion of the first shaft section. A second shaft section has a cylindrical inner surface with a plurality of serrations formed thereon. The second shaft section is adapted to telescopically receive the first shaft section. A radially extending annular groove is formed in the cylindrical inner surface of the second shaft section for receiving the elastically deformable locking ring.

The present steering shaft coupling further includes a second ring which is an elastomeric axial load ring. The second ring is mounted to the leading portion of the first shaft section and positioned between a shoulder formed on the first shaft section and a frustro-conical throat formed in the second shaft section such that the first and second shaft sections will be biased in the direction of separation, while being prevented from unwanted separation by the action of the elastically deformable locking ring. Each of the two rings included in the first preferred embodiment of the present invention is a single piece having a frustro-conical leading section and a cylindrical trailing section. In an alternative preferred embodiment, the elastically deformable locking ring may comprise two arcuate ring sections which are urged into contact with the annular groove formed in the second shaft section by a spring extending through a diametral hole formed in the leading portion of the first shaft section.

According to another aspect of the present invention, a method for assembling a steering shaft having an axial locking device and a separate axial loading device includes the steps of providing a first shaft section having a cylindrical outer surface with a plurality of serrations formed therein, providing an elastically deformable locking ring mounted in an annular groove formed in the leading portion of the first shaft section, and providing a second shaft section having a cylindrical inner surface with a plurality of serrations formed thereon, with the second shaft section adapted to telescopically receive said first shaft section and with said second shaft section having a radially extending annular groove formed in the cylindrical inner surface of the second shaft section for receiving the elastically deformable locking ring. The present inventive method further includes the steps of providing an elastomeric axial load ring and seal mounted to the leading portion of the first shaft section and positioned approximate a shoulder formed on the first shaft section, with the elastomeric ring having a frustro-conical section adapted to sealingly engaged a frusto-conical throat formed in the second shaft section, followed by the steps of telescopically engaging the first shaft section and the second shaft section such that the elastomeric ring engages the second shaft section and resiliently biases the first and second shaft sections when the first shaft section and second shaft section have been engaged sufficiently to lock the elastically deformable locking ring between the annual grooves formed in the shaft sections.

It is an advantage of the steering shaft coupling according to the present invention that the present coupling allows a steering system to be easily installed at a vehicle assembly plant, while nevertheless permitting subsequently disassembly for field service.

It is a further advantage of the present invention that the resistance of the present steering shaft coupling to unwanted axial movement while in use in a vehicle, which movement may result in unwanted noise, vibration and harshness, is mitigated because the axially loading element in this coupling is an elastomeric ring which will not undergo degradation caused by corrosion. This is a significant improvement over the prior art, because the inventors of this coupling realized that housing their elastomeric element within the coupling allowed the use of a non-corroding biasing element.

It is a further advantage of a steering shaft coupling according to the present invention that shaft coupling produces superior results at a lower cost than other known systems.

Other advantages, as well as objects and features of the present invention, will become apparent to the reader of this specification.

DETAILED DESCRIPTION

Figure 1:
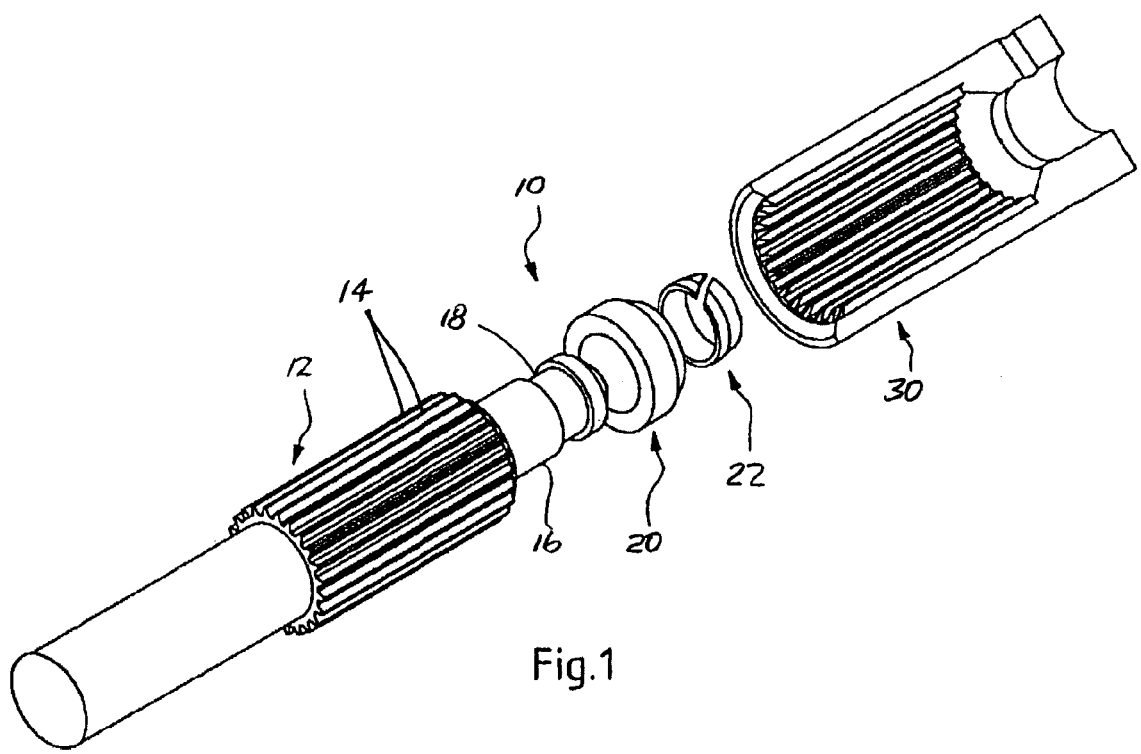
FIG. 1 is an exploded perspective view of a shaft coupling system according to the present invention.
Figure 2:
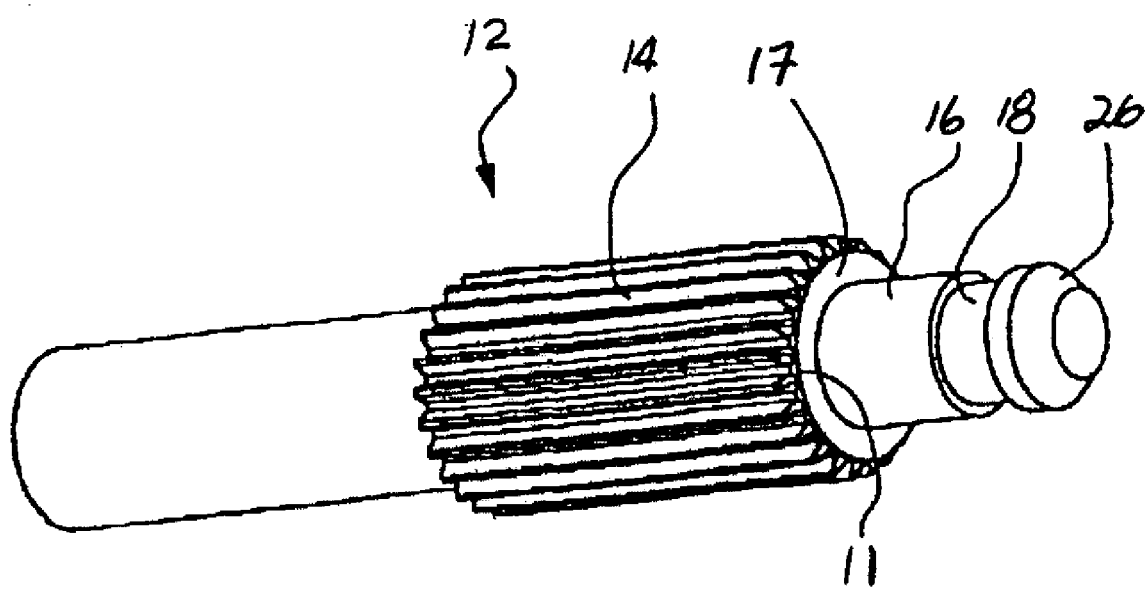
FIG. 2 illustrates the male portion of a shaft coupling system according to the present invention.

As shown in FIGS. 1 and 2, steering shaft coupling 10 has a first shaft section 12, second shaft section 30, locking ring 22 and elastomeric axial load ring and seal 20. First shaft section 12 is the male portion of the shaft coupling, and second shaft section 30 is the female portion.

Further details of first shaft section 12 are shown in FIG. 2. First shaft section 12 has outer spline section 14 formed therein with pointed outer tips 11 which aid in engagement with second shaft section 30. First shaft section 12 would normally be part of the steering column of a vehicle, whereas second shaft 30 would normally be part of the steering gear of the vehicle. Those skilled in the art will appreciate in view of this disclosure, however, that other types of arrangements of a steering shaft coupling according to the present invention may be used. First shaft section 12 further includes leading portion 16 having groove 18 machined or formed therein for carrying locking ring 22. Elastomeric axial load ring and seal 20 is also mounted upon leading portion 16 and abuts the portion of shaft 12 having outer spline 14 formed therein. This shoulder is shown at 17 in FIG. 2. FIG. 2 also shows chamfered tip 26 which is formed on first shaft section 12 so as to pilot the insertion of first shaft section 12 into second shaft section 30.

Figure 3:
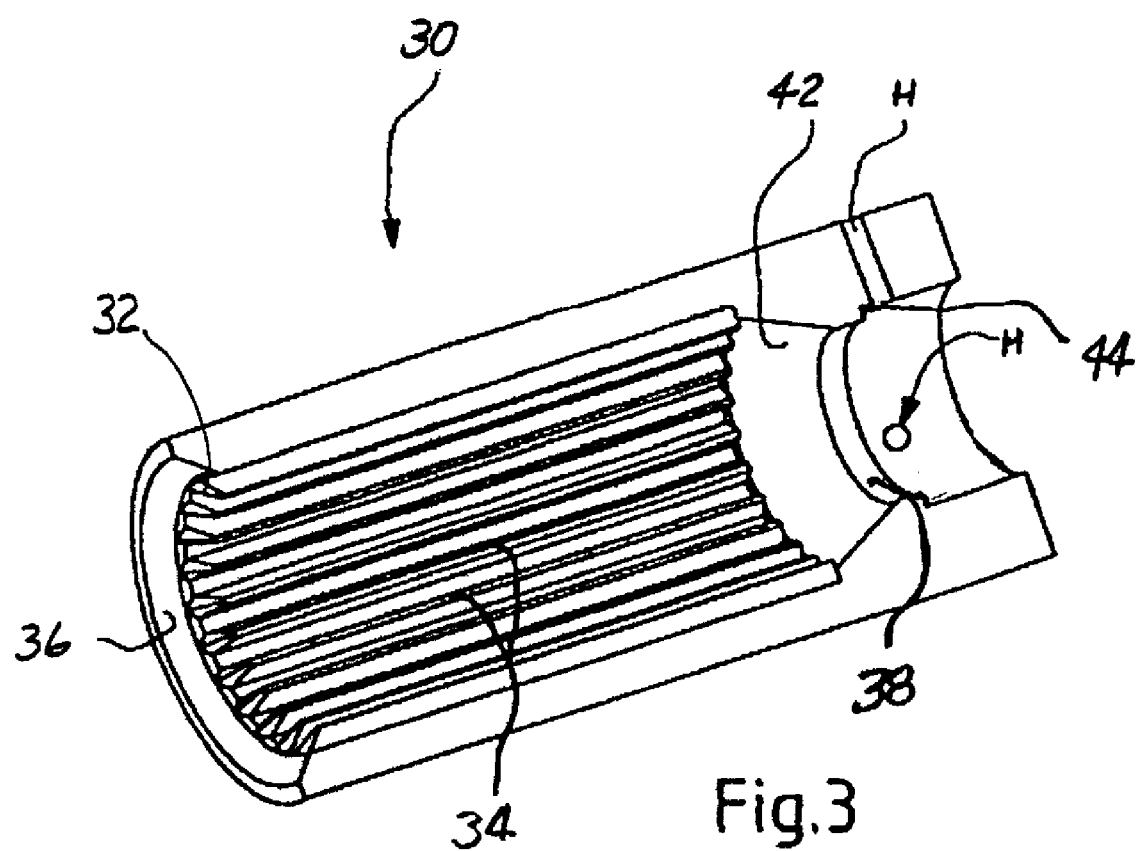
FIG. 3 illustrates the female portion of a shaft coupling system according to the present invention.
Figure 5:
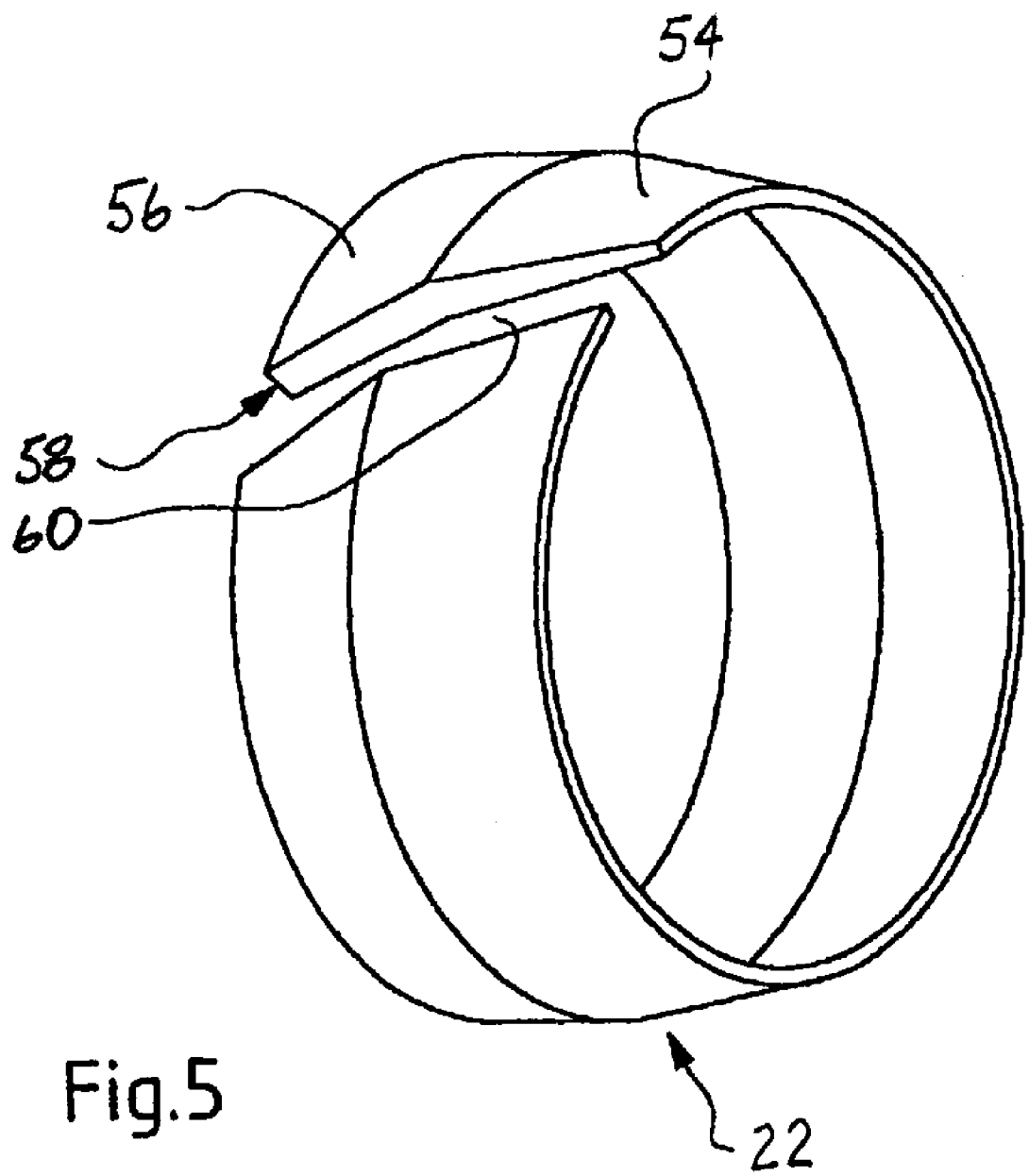
FIG. 5 illustrates an elastically deformable locking ring according to one aspect of the present invention.

FIG. 3 shows further details of second shaft section 30. More specifically, a plurality of inner splines 34 is formed in the cylindrical inner surface of second shaft section 20. These splines match with serrations 14 formed on the outer cylindrical surface of first shaft section 12, so as to transmit the torque between the interlocked shaft sections. Second shaft section 30 has a conically shaped entry section 36 which is designed to work with angled outer tips 32 of inner splines 34 so as to allow piloting of the shaft sections when they are brought together. Second shaft section 30 also has frustro-conical throat section 42 which forms part of the housing of elastomeric axial load ring and seal 20 when the elastomeric ring 20 is compressed at the time the present steering shaft coupling is assembled into its final position. Second shaft section 30 also has shoulder 44 formed at the outlet of frustro-conical section 42. Shoulder 44 serves to catch the locking edge 58 of locking ring 22 (FIG. 5). Second shaft section 30 also has a plurality of radially directed holes H which are intended to allow passage of a tool for compressing elastically deformable locking ring 22 so as to allow disassembly of the present steering shaft coupling for field service purposes.

Figure 4:
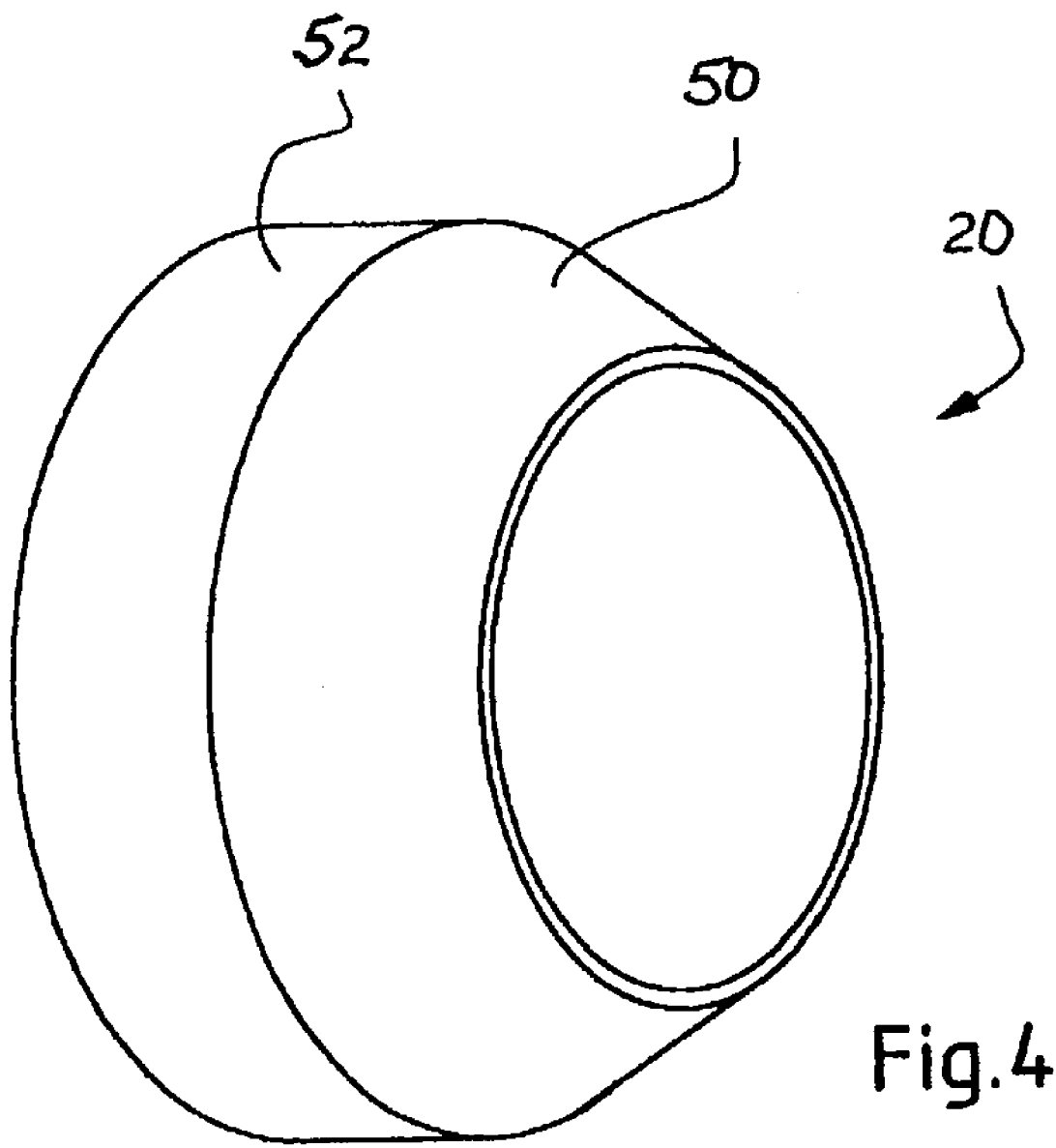
FIG. 4 illustrates an elastomeric axial load ring and seal according to the present invention.

As shown in FIG. 4, elastomeric axial load ring 20 has frustro-conical leading section 50 which serves a sealing function when engaged with the throat 42 of second shaft section 30, and cylindrical trailing section 52, which supports frustro-conical section 50 and aids in the axial loading function of elastomeric ring 20. In effect, elastomeric ring 20 resiliently biases the shaft sections in the direction of separation. This in turn causes locking ring 20 to be tightly loaded in an axial direction, so as to eliminate unwanted vibration during operation of a vehicle having the present coupling.

Locking ring 22, as seen in FIG. 5, has a frustro-conical leading section 54 and a cylindrical trailing section 56, as well as locking edge 58. Notch 60 within locking ring 22 allows locking ring to compress and expand radially so as to lock within an annular groove section defined by groove 18 on first shaft section 12 and groove portion 45 formed in second shaft section 30.

Figure 6:
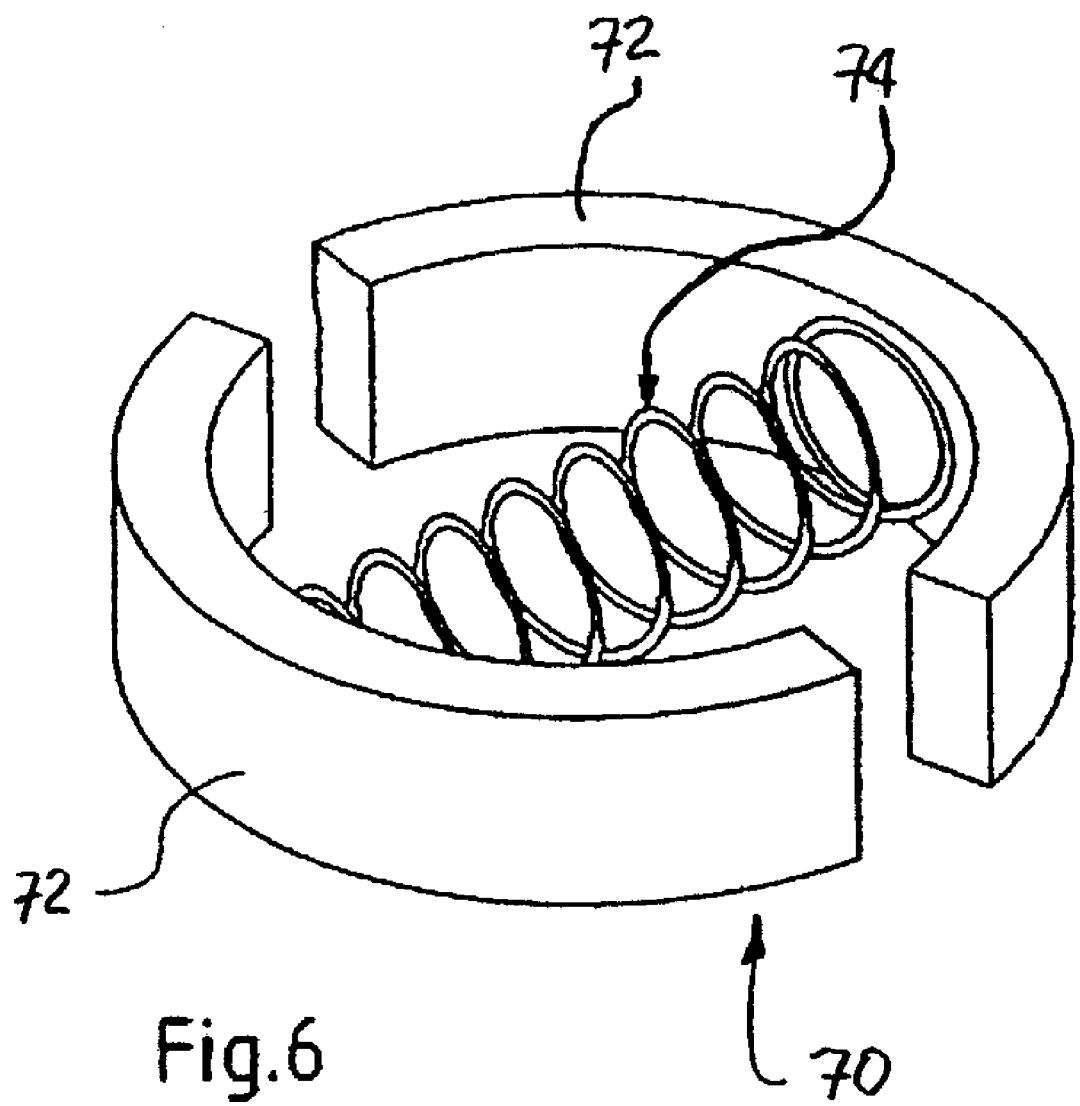
FIG. 6 illustrates a second type of elastically deformable locking ring utilizing a spring according to the present invention.

FIG. 6 shows second embodiment 70 of elastically deformable locking ring according to the present invention in which two arcuate segments 72 are biased in a radially outwardly direction by means of spring 74 which passes through a bore (not shown) which is formed diametrically through first shaft section 12. In use, locking ring 70 is located in the same position as ring 22.

Figure 7:
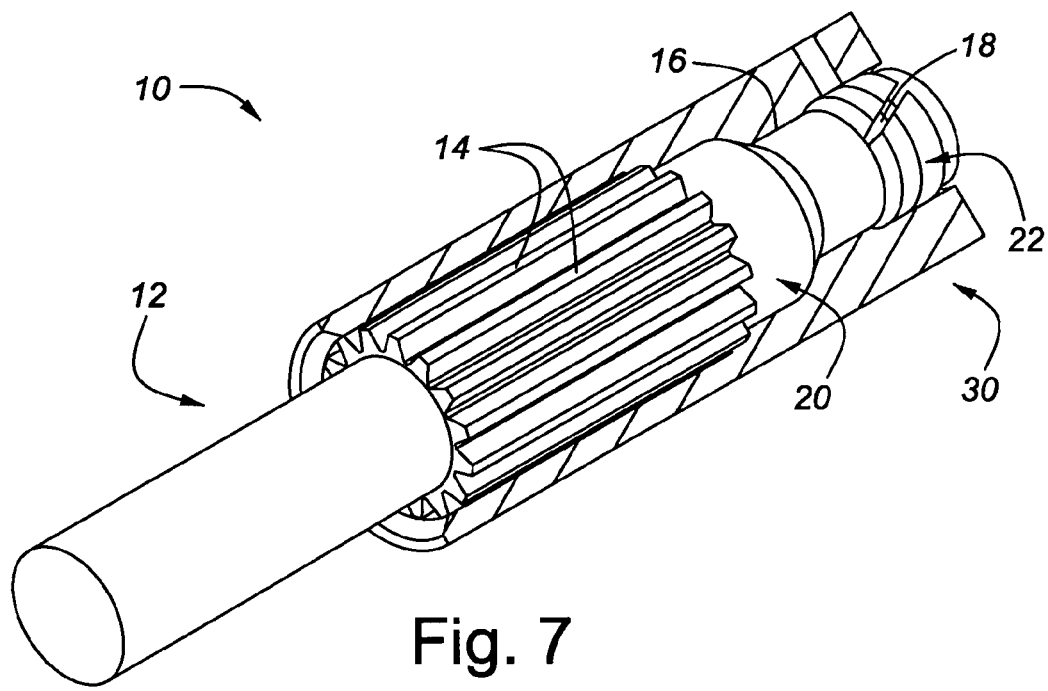
FIG. 7 is a perspective view of a shaft coupling system according to the present invention, showing in the fully locked position and having a locking ring 22 located therein.
Figure 8:
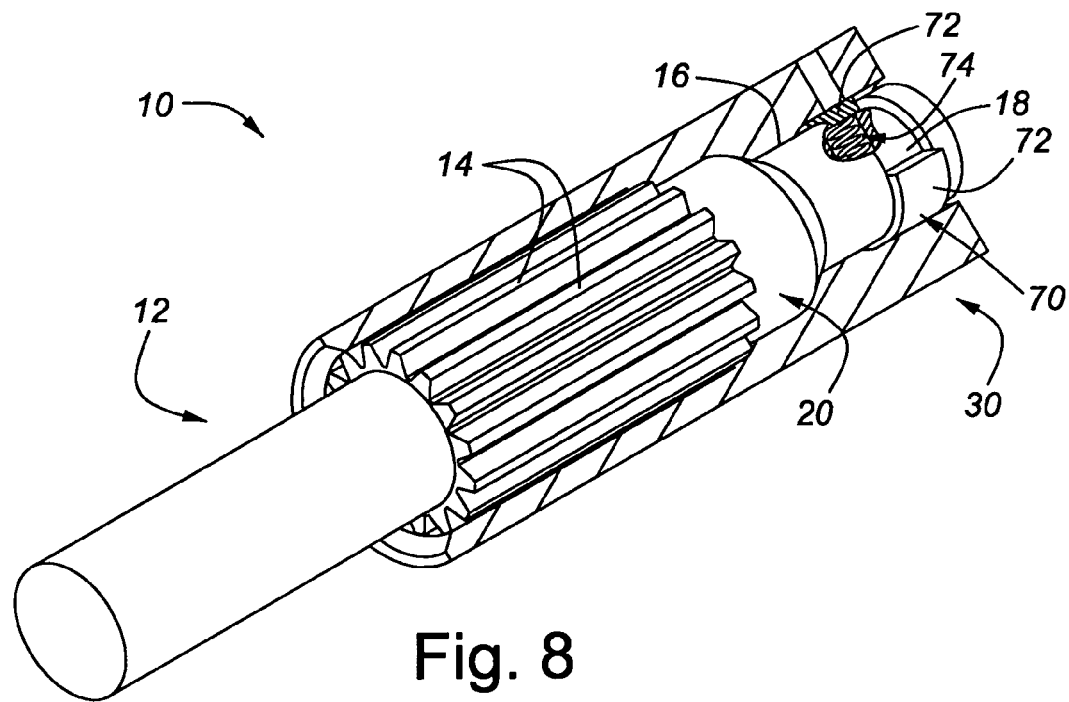
FIG. 8 is similar to FIG. 7, but shows a locking ring using a spring and two arcuate segments, 72.

FIG. 7 illustrates a fully assembled steering shaft coupling according to the present invention in which a locking ring 22, as seen in FIG. 5, is positioned within the assembled shaft coupling. FIG. 8, on the other hand, shows an assembled shaft coupling according to the present invention in which two arcuate segments 72 are biased in a radially outwardly direction by means of spring 74 which passes through a bore formed diametrically through the first shaft section 12.

As seen in both FIGS. 7 and 8, elastomeric axial load ring and seal 20 is compressed so as to bias the first and second shaft sections in the direction of separation.

Although the present invention has been described in connection with particular embodiments thereof, it is to be understood that various modifications, alterations, and adaptations may be made by those skilled in the art without departing from the spirit and scope of the invention set forth in the following claims.

The invention claimed is:

1. A steering shaft coupling for an automotive vehicle, comprising:
    a first shaft section having a cylindrical outer surface with a plurality of serrations formed thereon;
    an elastically deformable locking ring mounted in an annular groove formed in a leading portion of said first shaft section;
    a second shaft section having a cylindrical inner surface with a plurality of serrations formed thereon, with said second shaft adapted to telescopically receive said first shaft section;
    a radially extending internal annular groove formed in said cylindrical inner surface of said second shaft section, for receiving said elastically deformable locking ring; and
    an elastomeric axial load ring mounted to said leading portion of said first shaft section and positioned between a shoulder formed on said first shaft section and a frustro-conical throat formed in said second shaft section such that said first and second shaft sections will be biased in the direction of separation.

2. A steering shaft coupling according to claim 1, wherein said elastically deformable locking ring comprises a single piece ring having a frustro-conical leading section and a cylindrical trailing section.

3. A steering shaft coupling according to claim 1, wherein said elastomeric axial load ring comprises a single piece ring having a frustro-conical leading section and a cylindrical trailing section, with said frustro-conical section being in contact with said frustro-conical throat formed in said second shaft section.

4. A steering shaft coupling according to claim 1, wherein said elastically deformable locking ring comprises two arcuate ring segments which are urged into contact with said annular groove formed in said second shaft section by a spring extending through a diametral hole formed in said leading portion of the first shaft section.

5. A steering shaft coupling for an automotive vehicle, comprising:
- a first shaft section having a cylindrical outer surface with a plurality of serrations formed thereon;
- an elastically deformable locking ring mounted in an annular groove formed in a leading portion of said first shaft section;
- a second shaft section having a cylindrical inner surface with a plurality of serrations formed thereon, with said second shaft section adapted to telescopically receive said first shaft section;
- a radially extending annular groove formed in said cylindrical inner surface of said second shaft section, for receiving said elastically deformable locking ring; and
- an elastomeric axial load ring and seal mounted to said leading portion of said first shaft section and positioned between a shoulder formed on said first shaft section and a frustro-conical throat formed in said second shaft section, such that the elastomeric ring sealingly engages said second shaft section when said first shaft section and said second shaft section have been engaged sufficiently to lock said elastically deformable locking ring between said shaft sections.

* * * * *